(12) United States Patent
Tang et al.

(10) Patent No.: US 12,288,063 B2
(45) Date of Patent: Apr. 29, 2025

(54) METHODS FOR CONTROLLING APPLICATION INSTANCE TO BE ONLINE OR OFFLINE, ELECTRONIC DEVICE, AND STORAGE MEDIUM

(71) Applicant: BOE TECHNOLOGY GROUP CO., LTD., Beijing (CN)

(72) Inventors: Yawen Tang, Beijing (CN); Huan Lv, Beijing (CN); Lisha Dou, Beijing (CN); Dawei Li, Beijing (CN); Weiwei Liu, Beijing (CN); Zhanqiu Yue, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 18/254,219

(22) PCT Filed: Oct. 26, 2021

(86) PCT No.: PCT/CN2021/126231
§ 371 (c)(1),
(2) Date: May 24, 2023

(87) PCT Pub. No.: WO2022/193659
PCT Pub. Date: Sep. 22, 2022

(65) Prior Publication Data
US 2024/0004652 A1    Jan. 4, 2024

(30) Foreign Application Priority Data

Mar. 15, 2021   (CN) .......................... 202110278042.1

(51) Int. Cl.
GO6F 9/30        (2018.01)

(52) U.S. Cl.
CPC ............................... G06F 9/30076 (2013.01)

(58) Field of Classification Search
CPC ......... G06F 9/30076; G06F 9/485; G06F 8/71
See application file for complete search history.

(56) References Cited

U.S. PATENT DOCUMENTS 6,883,015 B1 *   4/2005  Geen ...................... G10L 15/30
                                                         704/E15.047
2012/0180071 A1  7/2012  Lesandro et al.
(Continued)

FOREIGN PATENT DOCUMENTS

CN    104881746 A    9/2015
CN    109495559 A    3/2019
(Continued)

OTHER PUBLICATIONS

WO-2018032782-A1, Feb. 22, 2018, Chen Q (Year: 2018).*
(Continued)

Primary Examiner — Farley Abad
(74) Attorney, Agent, or Firm — Dority & Manning, P.A.

(57) ABSTRACT

A method for controlling an application instance to be online or offline includes: acquiring target indication information, the target indication information including an identification of a target application instance; according to the target indication information and stored target instances, determining an online or offline control instruction of the target application instance, wherein the target instances including application instances that are started and are in an offline state; and according to the online or offline control instruction of the target application instance, controlling the target application instance to be online or offline.

17 Claims, 6 Drawing Sheets

(56) References Cited

U.S. PATENT DOCUMENTS

| | | | |
|---|---|---|---|
| 2013/0097660 A1* | 4/2013 | Das | H04L 63/205 |
| | | | 726/1 |
| 2013/0130730 A1* | 5/2013 | Marcellino | H04W 68/00 |
| | | | 455/466 |
| 2013/0254125 A1* | 9/2013 | Sanders | G06Q 30/06 |
| | | | 726/4 |
| 2017/0041398 A1 | 2/2017 | Kumar et al. | |
| 2017/0083354 A1* | 3/2017 | Thomas | G06F 9/45558 |
| 2020/0272510 A1* | 8/2020 | Gauthier | G06F 9/4881 |

FOREIGN PATENT DOCUMENTS

| | | |
|---|---|---|
| CN | 111522664 A | 8/2020 |
| CN | 112114881 A | 12/2020 |
| CN | 112882749 A | 6/2021 |

OTHER PUBLICATIONS

Chinese Office Action (w/ English translation) for corresponding Chinese Application No. 202110278042.1, issued Jul. 27, 2023, 12 pages.

PCT International Search Report and Written Opinion (w/ English translations) for corresponding Application No. PCT/CN2021/126231, mailed Jan. 26, 2022, 13 pages.

\* cited by examiner

METHODS FOR CONTROLLING APPLICATION INSTANCE TO BE ONLINE OR OFFLINE, ELECTRONIC DEVICE, AND STORAGE MEDIUM

CROSS-REFERENCE TO RELATED APPLICATIONS

This application is a national phase entry under 35 USC 371 of International Patent Application No. PCT/CN 2021/126231 filed on Oct. 26, 2021, which claims priority to Chinese Patent Application No. 202110278042.1, filed with the Chinese Patent Office on Mar. 15, 2021, titled "METHODS AND APPARATUS FOR CONTROLLING APPLICATION INSTANCE TO BE ONLINE OR OFFLINE, AND STORAGE MEDIUM", which are incorporated herein by reference in their entirety.

TECHNICAL FIELD

The present disclosure relates to the field of application software technologies, and in particular, to methods for controlling an application instance to be online or offline, an electronic device, and a storage medium.

BACKGROUND

With the advent of the big data and cloud computing era, business systems are increasingly huge, and more developers or development groups need to cooperate to complete development of a business system. Therefore, the business system needs to be split into a plurality of functional modules, and each functional module (also referred to as application) may be independently developed, designed, operated and maintained as an independent subsystem. Instances of these applications (also referred to as application instances) may be registered to an application registration center to realize interaction between the applications, and may be integrated into the business system. The application registration center may manage an application instance to be online or offline. The application instance (also referred to as a service or microservice) is registered to the application registration center, which means that the application instance is online. The application instance is removed from the application registration center, which means that the application instance is offline.

SUMMARY

In an aspect, a method for controlling an application instance to be online or offline is provided. The method includes: acquiring target indication information, the target indication information including an identification of a target application instance; determining an online or offline control instruction of the target application instance according to the acquired target indication information and stored target instances, the target instances include application instances that are started and are in an offline state; and controlling the target application instance to be online or offline according to the online or offline control instruction of the target application instance.

In some embodiments, in a case where the target indication information is used for indicating that the target application instance is to be online, determining the online or offline control instruction of the target application instance according to the target indication information and the stored target instances, includes: determining whether the target application instance belongs to application instances of a preset type according to the identification of the target application instance.

In a case where the target application instance belongs to the application instances of the preset type, and the target instances do not include the target application instance, the online or offline control instruction of the target application instance is determined to be used to instruct the target application instance to be online.

In a case where the target application instance belongs to the application instances of the preset type, and the target instances include the target application instance, the online or offline control instruction of the target application instance is determined to be used to instruct the target application instance to be in the offline state.

In a case where the target application instance does not belong to the application instances of the preset type, and the target instances do not include the target application instance, the online or offline control instruction of the target application instance is determined to be used to instruct the target application instance in the offline state to be determined as a target instance.

In a case where the target application instance does not belong to the application instances of the preset type, and the target instances include the target application instance, the online or offline control instruction of the target application instance is determined to be used to instruct the target application instance to be online after receiving an online operation.

In some other embodiments, in a case where the target indication information is used for indicating that the target application instance is to be offline, determining the online or offline control instruction of the target application instance according to the target indication information and the stored target instances, includes: determining whether the target application instance belongs to application instances of a preset type according to the identification of the target application instance. In a case where the target application instance belongs to the application instances of the preset type, and the target instances do not include the target application instance in the offline state, the online or offline control instruction of the target application instance is determined to be used to instruct the target application instance to be offline and instruct the target application instance in the offline state to be determined as a target instance. In a case where the target application instance does not belong to the application instances of the preset type, the online or offline control instruction of the target application instance is determined to be used to instruct the target application instance to be offline.

In yet other embodiments, in a case where the online or offline control instruction of the target application instance is used to instruct the target application instance to be online after receiving the online operation, the method further includes: bringing the target application instance online in response to the online operation on the target application instance in the target instances.

In yet other embodiments, after the target application instance is brought online, the method further includes: updating the target instances. The updated target instances do not include the target application instance in the offline state.

In yet other embodiments, after controlling the target application instance to be online or offline according to the online or offline control instruction of the target application instance, the method further includes: determining an online or offline record of the target application instance as a target record. The target record includes the identification of the target application instance, and online or offline time of the target application instance.

In yet other embodiments, in a case where the target application instance belongs to the application instances of the preset type, the method further includes: in a case where a continuous duration of the target application instance in the offline state included in the target instances is greater than or equal to a preset duration, updating the target instances. The updated target instances do not include the target application instance in the offline state.

In another aspect, another method for controlling an application instance to be online or offline is provided. The method includes: querying and displaying a record of a target application instance in response to a query operation on the target application instance, the target application instance being an application instance that is started and is in an offline state or an application instance that is started and is in an online state, and the record including an identification of the target application instance and a state of the target application instance; and controlling the target application instance to be online or offline according to stored target instances in response to a target operation on the target application instance, the target instances including application instances that are started and are in the offline state.

In some embodiments, querying and displaying the record of the target application instance, includes: querying a record corresponding to the identification of the target application instance from all currently started application instances as the record of the target application instance; and displaying the record of the target application instance.

In some other embodiments, controlling the target application instance to be online or offline according to the stored target instances in response to the target operation on the target application instance, includes as follows.

Whether the target application instance belongs to application instances of a preset type is determined according to the identification of the target application instance.

In a case where the target operation is used for controlling the target application instance to be online, and the target instances include the target application instance, in response to the target operation on the target application instance, the target application instance is brought online, and the target instances are updated. The updated target instances do not include the target application instance in the offline state.

In a case where the target operation is used for controlling the target application instance to be offline, the target instances do not include the target application instance, and the target application instance belongs to the application instances of the preset type, in response to the target operation on the target application instance, the target application instance is brought offline, and the target application instance in the offline state is determined as a target instance.

In a case where the target operation is used for controlling the target application instance to be offline, the target instances do not include the target application instance, and the target application instance does not belong to the application instances of the preset type, in response to the target operation on the target application instance, the target application instance is brought offline.

In yet other embodiments, the method further includes: after the target application instance is brought online or offline, determining an online or offline record of the target application instance as a target record. The target record includes the identification of the target application instance, and online or offline time of the target application instance.

In yet another aspect, an electronic device is provided. The electronic device includes a processor and a memory for storing instructions executable by the processor. The processor is configured to execute the executable instructions, so as to implement one or more steps of a method for controlling an application instance to be online or offline. The method includes: acquiring target indication information, the target indication information including an identification of a target application instance; determining an online or offline control instruction of the target application instance according to the target indication information and stored target instances, the target instances including application instances that are started and are in an offline state; and controlling the target application instance to be online or offline according to the online or offline control instruction of the target application instance.

In yet another aspect, a non-transitory computer-readable storage medium is provided. The non-transitory computer-readable storage medium stores computer program instructions. When run on a processor; the computer program instructions cause the processor to execute one or more steps of the method in any one of the above embodiments.

In yet another aspect, a computer program product embodied on a non-transitory computer-readable storage medium is provided. The computer program product includes computer program instructions. When run on a computer, the computer program instructions cause the computer to execute one or more steps of the method in any one of the above embodiments.

In yet another aspect, a computer program is provided. When executed on a computer, the computer program causes the computer to execute one or more steps of the method in any one of the above embodiments.

In some embodiments, in a case where the target indication information is used for indicating that the target application instance is to be online, determining the online or offline control instruction of the target application instance according to the target indication information and the stored target instances, includes: determining whether the target application instance belongs to application instances of a preset type according to the identification of the target application instance.

In a case where the target application instance belongs to the application instances of the preset type, and the target instances do not include the target application instance, determining that the online or offline control instruction of the target application instance is used to instruct the target application instance to be online.

In a case where the target application instance belongs to the application instances of the preset type, and the target instances include the target application instance, determining that the online or offline control instruction of the target application instance is used to instruct the target application instance to be in the offline state.

In a case where the target application instance does not belong to the application instances of the preset type, and the target instances do not include the target application instance, determining that the online or offline control instruction of the target application instance is used to instruct the target application instance in the offline state to be determined as a target instance.

In a case where the target application instance does not belong to the application instances of the preset type, and the target instances include the target application instance, determining that the online or offline control instruction of the target application instance is used to instruct the target application instance to be online after receiving an online operation.

In some other embodiments, in a case where the target indication information is used for indicating that the target application instance is to be offline, determining the online or offline control instruction of the target application instance according to the target indication information and the stored target instances, includes: determining whether the target application instance belongs to application instances of a preset type according to the identification of the target application instance. In a case where the target application instance belongs to the application instances of the preset type, and the target instances do not include the target application instance in the offline state, determining that the online or offline control instruction of the target application instance is used to instruct the target application instance to be offline and instruct the target application instance in the offline state to be determined as a target instance. In a case where the target application instance does not belong to the application instances of the preset type, determining that the online or offline control instruction of the target application instance is used to instruct the target application instance to be offline.

In yet other embodiments, after controlling the target application instance to be online or offline according to the online or offline control instruction of the target application instance, the method further includes: determining an online or offline record of the target application instance as a target record. The target record includes the identification of the target application instance, and online or offline time of the target application instance.

In yet other embodiments, in a case where the target application instance belongs to the application instances of the preset type, the method further includes: in a case where a continuous duration of the target application instance in the offline state included in the target instances is greater than or equal to a preset duration, updating the target instances. The updated target instances do not include the target application instance in the offline state.

In yet another aspect, an electronic device is provided. The electronic device includes a processor and a memory for storing instructions executable by the processor. The processor is configured to execute the executable instructions, so as to implement one or more steps of another method for controlling an application instance to be online or offline. The method includes: querying and displaying a record of a target application instance in response to a query operation on the target application instance, the target application instance being an application instance that is started and is in an offline state or an application instance that is started and is in an online state, and the record including an identification of the target application instance and a state of the target application instance; and controlling the target application instance to be online or offline according to stored target instances in response to a target operation on the target application instance, the target instances including application instances that are started and are in the offline state.

BRIEF DESCRIPTION OF THE DRAWINGS

In order to describe technical solutions in the present disclosure more clearly, accompanying drawings to be used in some embodiments of the present disclosure will be introduced briefly below. Obviously, the accompanying drawings to be described below are merely accompanying drawings of some embodiments of the present disclosure, and a person of ordinary skill in the art may obtain other drawings according to these drawings. In addition, the accompanying drawings to be described below may be regarded as schematic diagrams, and are not limitations on an actual size of a product, an actual process of a method, and an actual timing of a signal involved in the embodiments of the present disclosure.

DETAILED DESCRIPTION

Figure 1:
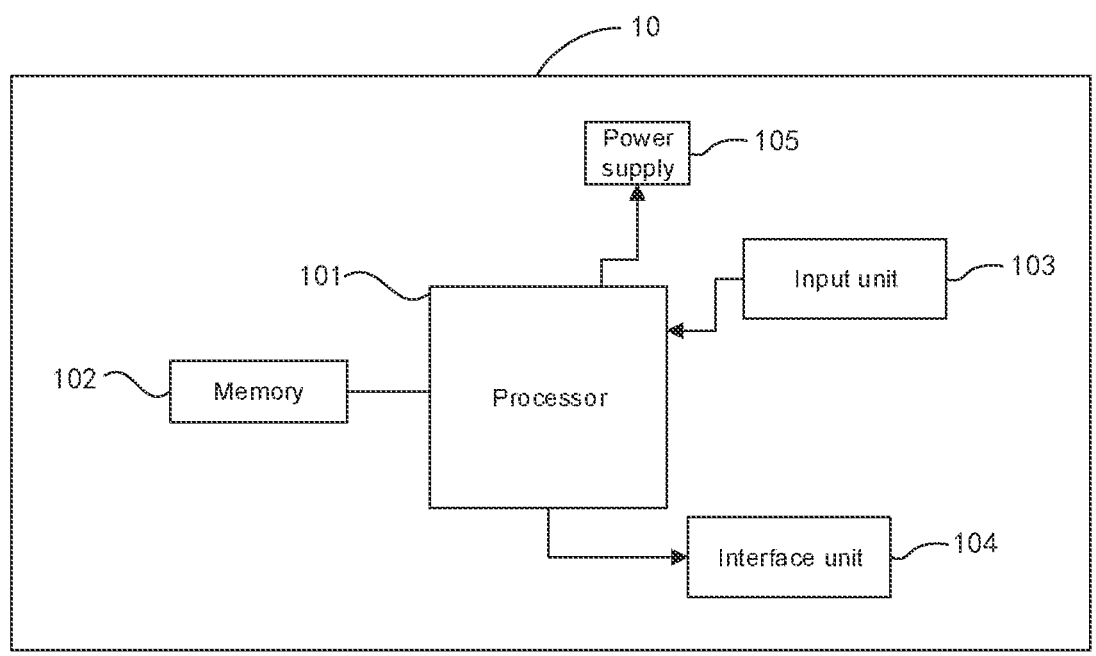
FIG. 1 is a structural diagram of an electronic device, in accordance with some embodiments.

First, some terms involved in the embodiments of the present disclosure will be briefly introduced.

Unless the context requires otherwise, throughout the description and the claims, the term "comprise" and other forms thereof such as the third-person singular form "comprises" and the present participle form "comprising" are construed as an open and inclusive meaning, i.e., "including, but not limited to." In the description of the specification, the terms such as "one embodiment," "some embodiments," "exemplary embodiments," "an example," "specific example" or "some examples" are intended to indicate that specific features, structures, materials or characteristics related to the embodiment(s) or example(s) are included in at least one embodiment or example of the present disclosure. Schematic representations of the above terms do not necessarily refer to the same embodiment(s) or example(s). In addition, the specific features, structures, materials or characteristics may be included in any one or more embodiments or examples in any suitable manner.

Hereinafter, the terms such as "first" and "second" are only used for descriptive purposes, and are not to be construed as indicating or implying relative importance or implicitly indicating the number of indicated technical features. Thus, a feature defined with "first" or "second" may explicitly or implicitly include one or more of the features. In the description of the embodiments of the present disclosure, the term "a plurality of/the plurality of" means two or more unless otherwise specified.

The phrase "at least one of A, B and C" has the same meaning as the phrase "at least one of A, B or C", both including following combinations of A, B and C: only A, only B, only C, a combination of A and B, a combination of A and C, a combination of B and C, and a combination of A, B and C.

The phrase "A and/or B" includes following three combinations: only A, only B, and a combination of A and B.

As used herein, the term "if" is, optionally, construed to mean "when" or "in a case where" or "in response to determining" or "in response to detecting", depending on the context. Similarly, the phrase "if it is determined" or "if [a stated condition or event] is detected" is, optionally, construed to mean "in a case where it is determined" or "in response to determining" or "in a case where [the stated condition or event] is detected" or "in response to detecting [the stated condition or event]", depending on the context.

The use of the phrase "applicable to" or "configured to" herein means an open and inclusive expression, which does not exclude devices that are applicable to or configured to perform additional tasks or steps.

In addition, the use of the phase "based on" means openness and inclusiveness, since a process, step, calculation or other action that is "based on" one or more stated conditions or values may, in practice, be based on additional conditions or values exceeding those stated.

An application instance in the embodiments of the present disclosure refers to an instance of an application program, which may also be referred to as a service or microservice.

Spring Cloud Eureka serves as the application registration center for managing the application instance to be online or offline due to its strong registration discovery capability. After an application program is started, an application instance is created, and is written into a registration interface of the application registration center (e.g., Eureka), so as to control the application instance to be online or offline by using Eureka. At present, when the application instance is controlled to be online or offline by using Eureka, an online operation is triggered only by starting the application instance, and an offline operation is realized only by stopping the application instance, so that the application instance cannot be controlled to be online or offline manually.

An online or offline control of an application instance in an online registration interface or an offline registration interface of an application registration center is modified in the embodiments of the present disclosure, so as to manually control the application instance to be online or offline.

Technical solutions in the embodiments of the present disclosure will be described clearly and completely below with reference to the accompanying drawings in the embodiments of the present disclosure, Obviously, the described embodiments are merely some but not all embodiments of the present disclosure. All other embodiments obtained by a person of ordinary skill in the art without any creative effort based on the embodiments of the present disclosure shall be included in the protection scope of the present disclosure.

A method for controlling an application instance to be online or offline provided in the embodiments of the present disclosure may be implemented by an electronic device 10 as shown in FIG. 1. FIG. 1 is a structural diagram of the electronic device to which the technical solutions provided in the embodiments of the present disclosure are applicable. The electronic device 10 in FIG. 1 includes, but is not limited to, a processor 101, a memory 102, an input unit 103, an interface unit 104 and a power supply 105.

The processor 101 is a control center of the electronic device, and connects various parts of the entire electronic device by using various interfaces and circuits to perform various functions of the electronic device and process data by running or executing software programs and/or modules stored in the memory 102 and calling data stored in the memory 102, thereby integrally monitoring the electronic device. The processor 101 may include one or more processing units. An application processor and a modem processor may be integrated in the processor 101. The application processor mainly processes operating systems, user interfaces and application programs, and the modem processor mainly processes wireless communications. It can be understood that the modern processor may not be integrated in the processor 101.

The memory 102 may be used for storing software programs and various data. The memory 102 may mainly include a stored program area and a stored data area. The stored program area may store the operating systems, application programs required for at least one functional unit. In addition, the memory 102 may include a high speed random access memory, and may further include a non-volatile memory, such as at least one magnetic disk storage device, a flash memory device, or other volatile solid state storage devices. The memory 102 may be a non-transitory computer-readable storage medium, e.g., read-only memory (ROM), random access memory (RAM), compact disc read-only memory (CD-ROM), magnetic tape, floppy disk, or optical data storage device.

The input unit 103 may be a keyboard, a touch screen or other device.

The interface unit 104 is an interface connecting an external device to the electronic device 10. For example, the external device may be a wired or wireless headset port, an external power supply (or battery charger) port, a wired or wireless data port, a memory card port, a port connected to an apparatus with an identification module, an audio input/output (I/O) port, a video I/O port, or an earphone port. The interface unit 104 may be used for receiving input information (e.g., data information) from the external device, and transmitting the received input information to one or more components in the electronic device 10. Alternatively, the interface unit 104 may be used for transmitting data between the electronic device 10 and the external device.

The power supply 105 (e.g., battery) may be used for supplying power to various components. The power supply 105 may be logically connected to the processor 101 through a power management system, so that charging, discharging, and power consumption managements are realized through the power management system.

A computer instruction in the embodiments of the present disclosure may be referred to as an application program code or system, which is not specifically limited in the embodiments of the present disclosure.

Figure 2:
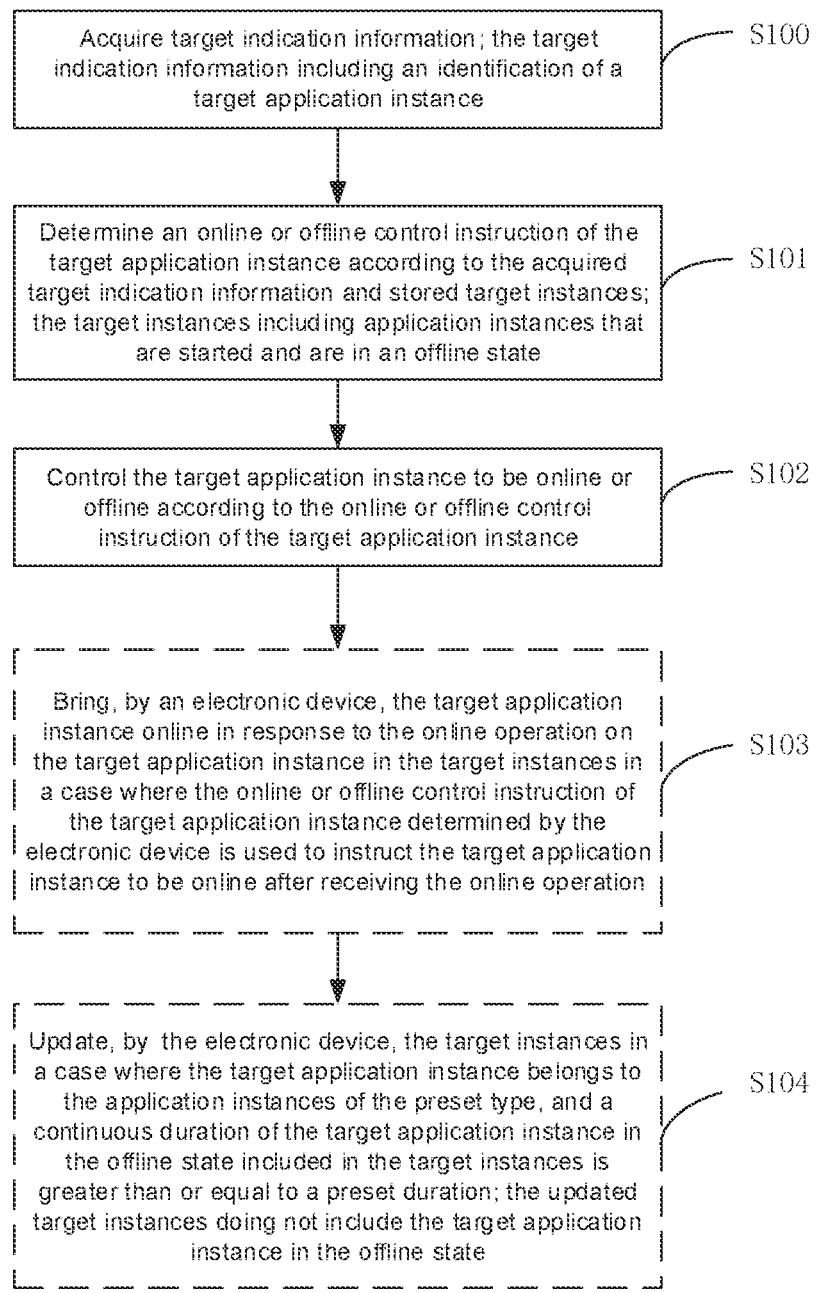
FIG. 2 is a flow diagram of a method for controlling an application instance to be online or offline, in accordance with some embodiments.

It will be noted that the electronic device shown in FIG. 1 is merely an example, and does not limit the electronic device to which the embodiments of the present disclosure are applicable. In actual implementation, the electronic device may include more or fewer devices or components than those shown in FIG. 1, FIG. 2 is a flow diagram of the method for controlling the application instance to be online or offline provided in the embodiments of the present disclosure, and this method may be applied to the electronic device shown in FIG. 1. The method shown in FIG. 2 may include following steps (S100 to S104).

In S100, the electronic device acquires target indication information. The target indication information includes an identification of a target application instance.

In a possible implementation, when the electronic device scans the online registration interface or the offline registration interface of the application registration center, the generation of the target indication information may be triggered in a case where an identification of the application instance is in the online registration interface or the offline registration interface. For example, assuming that the electronic device scans the online registration interface of the application registration center, and the identification of the application instance included in the online registration interface includes an identification of Application instance 1, the electronic device generates target indication information including the identification of Application instance 1. Application instance 1 is the target application instance.

In another possible implementation, the generation of the target indication information is automatically triggered after the identification of the target application instance is written into the online registration interface or the offline registration interface of the application registration center. For example, after the electronic device writes the identification of Application instance 1 into the online registration interface of the application registration center, the electronic device automatically generates the target indication information including the identification of Application instance 1. Application instance 1 is the target application instance.

It can be understood that the target indication information including the identification of the target application instance in the embodiments of the present disclosure may be used for indicating that the target application instance is to be online, or the target application instance is to be offline. The target indication information may have various specific representations. In an example, assuming that the target indication information is A.f(x), where A is the identification of the target application instance (e.g., A is an object of the target application instance) and f(x) is a function for bringing the application instance online, A.f(x) is used for indicating that the target application instance is to be online. In another example, assuming that the target indication information is f(A), where A is the identification of the target application instance (e.g., A is an identifier of the target application instance) and f( ) is a function for bringing the application instance online, f(A) is used for indicating that the target application instance is to be online.

In S101, the electronic device determines an online or offline control instruction of the target application instance according to the acquired target indication information and stored target instances. The target instances include application instances that are started and are in an offline state.

In some embodiments, the electronic device determines whether the target application instance belongs to application instances of a preset type according to the identification of the target application instance. In a possible implementation, application programs of the preset type are stored in the electronic device. In a case where a target application program corresponding to the target application instance exists in the application programs of the preset type, the target application instance belongs to the application instances of the preset type. For example, the electronic device stores a white list as shown in Table 1 below. If an identification of the target application program is in the white list, the application instance of the target application program belongs to the application instances of the preset type.

TABLE 1

| Identifications of Application Programs |
| --- |
| Application Program 1 |
| Application Program 2 |
| Application Program 3 |

In another possible implementation, during the generation of identifications of application instances, identifications of the application instances of the preset type each include preset character(s). For example, an application instance whose identification includes characters "1Y" belongs to the application instances of the preset type, and an application instance whose identification includes characters "2N" does not belong to the application instances of the preset type.

In a case where the target indication information is used for indicating that the target application instance is to be online, there are following cases.

In a case where the target application instance belongs to the application instances of the preset type, and the target instances do not include the target application instance, the electronic device determines that the online or offline control instruction of the target application instance is used to instruct the target application instance to be online. The target instance may be an application instance represented by an application instance identification stored in a database table (for example, identifications of application instances of the preset type in the offline state are stored in an offline table, and identifications of application instances of a non-preset type in the offline state are stored in an online table). In this way, an ability to apply the white list is provided, and a user may add an identification of a trusted application program to the white list. As long as an application instance of the application program is not brought offline manually (i.e., there is no identification of the application instance in the offline state in the offline table), this application instance may be automatically online. An application instance of an application program represented by an application program identification that is not in the white list is required to be brought online in response to an online operation, so that the application instance of the application program that is not in the white list is brought online controllably, and a safety risk is reduced.

According to the pre-stored application programs of the preset type, if the electronic device determines that the target application program corresponding to the target application instance exists in the pre-stored application programs of the preset type, the target application instance is determined to belong to the application instances of the preset type; if the electronic device determines that the target application program corresponding to the target application instance does not exist in the pre-stored application programs of the preset type, the target application instance is determined not to belong to the application instances of the preset type. Based on the examples in Table 1, in a case where an application instance of Application Program 2 belongs to the application instances of the preset type, and the offline table does not include an identification of the application instance represented by Application Program 2 in the offline state, the electronic device determines that an online or offline control instruction of this application instance is used to instruct this application instance to be online.

In a case where the target application instance belongs to the application instances of the preset type, and the target instances include the target application instance, the electronic device determines that the online or offline control instruction of the target application instance is used to instruct the target application instance to be in the offline state.

For example, the application instance represented by Application Program 2 belongs to the application instances of the preset type, and the offline table includes the identification of the application instance of Application Program 2. Thus, the electronic device determines that the online or offline control instruction of this application instance is used to instruct this application instance to be in the offline state, and this application instance is not allowed to be online.

In a case where the target application instance does not belong to the application instances of the preset type, and the target instances do not include the target application instance, the electronic device determines that the online or offline control instruction of the target application instance is used to instruct the target application instance in the offline state to be determined as a target instance.

For example, in a case where the identification of the target application program is not in the white list shown in Table 1, the electronic device determines that the application instance of the target application program does not belong to the application instances of the preset type, and the identification of the application instance of the target application program is not in the online table, the electronic device determines that the online or offline control instruction of the application instance of the target application program is used to instruct the application instance of the target application program in the offline state to be added to the online table. In this way, in a case where the application instance of the application program represented by the application program identification that is not in the white list is not in the online table, the electronic device adds this application instance to the online table, so that the application instance of the application program that is not in the white list is brought online controllably, which reduces a safety risk possibly due to a fact that the application instance is automatically online upon startup.

In a case where the target application instance does not belong to the application instances of the preset type, and the target instances include the target application instance, the electronic device determines that the online or offline control instruction of the target application instance is used to instruct the target application instance to be online after receiving the online operation.

For example, in a case where the identification of the target application program is not in the white list shown in Table 1, the electronic device determines that the application instance of the target application program does not belong to the application instances of the preset type, and the identification of the application instance of the target application program is in the online table, the electronic device determines that the online or offline control instruction of the application instance of the target application program is used to instruct the application instance of the target application program to be online after receiving the online operation. In this way, in a case where the application instance of the application program represented by the application program identification that is not in the white list is in the online table, the electronic device brings this application instance online after receiving the online operation, so that the application instance of the application program that is not in the white list is brought online controllably, which reduces the safety risk possibly due to the fact that the application instance is automatically online upon startup.

In a case where the target indication information is used for indicating that the target application instance is to be offline, there are following cases.

In a case where the target application instance belongs to the application instances of the preset type, and the target instances do not include the target application instance in the offline state, the electronic device determines that the online or offline control instruction of the target application instance is used to instruct the target application instance to be offline and instruct the target application instance in the offline state to be determined as a target instance.

For example, in a case where Application Program 1 is in the white list shown in Table 1, an application instance of Application Program 1 belongs to the application instances of the preset type, and an identification of the application instance of Application Program 1 is not included in the offline table, the electronic device determines that an online or offline control instruction of the application instance of Application Program 1 is used for indicating the application instance of Application Program 1 is to be offline, and the identification of the application instance of Application Program 1 is to be added to the offline table. In this way, after the user performs an offline operation, in a process of bringing the application instance online again, the application instance is detected to be in the offline table, and the electronic device prevents the application instance from being online automatically, so that a problem that the application instance that is brought offline is automatically online is solved.

In a case where the target application instance does not belong to the application instances of the preset type, the electronic device determines that the online or offline control instruction of the target application instance is used to instruct the target application instance to be offline.

For example, in a case where the target application program is not in the white list shown in Table 1, and the application instance of the target application program does not belong to the application instances of the preset type, the electronic device determines that the online or offline control instruction of the application instance of the target application program is used to instruct the application instance of the target application program to be offline.

In S102, the electronic device controls the target application instance to be online or offline according to the online or offline control instruction of the target application instance.

In some embodiments, in a case where the online or offline control instruction determined by the electronic device is used to instruct the target application instance to be online, the electronic device brings the target application instance online. For example, the electronic device brings the target application instance online by calling an online registration interface of Eureka.

In a case where the online or offline control instruction of the target application instance determined by the electronic device is used to instruct the target application instance to be in the offline state, the electronic device generates a first notification message, and the first notification message is used for notifying that the target application instance is in the offline state.

In a case where the online or offline control instruction of the target application instance determined by the electronic device is used to instruct the target application instance in the offline state to be determined as the target instance, in a possible implementation, the electronic device determines the target application instance in the offline state as the target instance; in another possible implementation, the electronic device establishes a corresponding relationship between the identification of the target application instance and an identification of the target instance.

In the case where the target application instance does not belong to the application instances of the preset type, and the target instances include the target application instance, the electronic device determines that the online or offline control instruction of the target application instance is used to instruct the target application instance to be online after receiving the online operation. For example, the electronic device generates a second notification message, and the second notification message is used to instruct the target application instance to be online after the online operation is received.

In a case where the online or offline control instruction of the target application instance determined by the electronic device is used to instruct the target application instance to be offline and instruct the target application instance in the offline state to be determined as the target instance, the electronic device brings the target application instance offline, and determines the target application instance in the offline state as the target instance. For example, the electronic device brings the target application instance offline by calling an offline registration interface of Eureka, and determines the target application instance in the offline state as the target instance.

In a case where the target application instance does not belong to the application instances of the preset type, and the online or offline control instruction of the target application instance determined by the electronic device is used to instruct the target application instance to be offline, the electronic device brings the target application instance offline. For example, the electronic device brings the target application instance offline by calling the offline registration interface of Eureka.

In S103, in a case where the online or offline control instruction of the target application instance determined by the electronic device is used to instruct the target application instance to be online after receiving the online operation, the electronic device brings the target application instance online in response to the online operation on the target application instance in the target instances. In this way, the electronic device may bring the target application instance online in response to the online operation on the application instance in the offline state, and the target application instance may be an application instance of the preset type or an application instance of the non-preset type.

The electronic device updates the target instances after the target application instance is brought online, and the updated target instances do not include the target application instance in the offline state.

In S104, in a case where the target application instance belongs to the application instances of the preset type, and a continuous duration of the target application instance in the offline state included in the target instances is greater than or equal to a preset duration, the electronic device updates the target instances, and the updated target instances do not include the target application instance in the offline state.

After the target application instance is brought online or offline, the electronic device determines an online or offline record of the target application instance as a target record. The target record includes the identification of the target application instance, and online or offline time of the target application instance. Next, the electronic device may display the target record in response to a query operation on the target record.

It will be noted that an execution sequence of S100 to S102, S103 and S104 is not limited in the embodiments of the present disclosure. For example, the electronic device executes S103 after executing S104, and then executes S100 to S102.

It will be understood that the target instances in the embodiments of the present disclosure may be application instances represented by application instance identifications stored in a database table, or application instances represented by application instance identifications stored in two database tables (e.g., the online table and the offline table), which is not limited in the embodiments of the present disclosure.

In the embodiments of the present disclosure, the electronic device determines the online or offline control instruction of the target application instance according to the target indication information and the stored target instances, and controls the target application instance to be online or offline according to the determined online or offline control instruction. The application instance included in the target instances may be managed in response to an operation instruction, so as to control the application instance to be online or offline.

Figure 3:
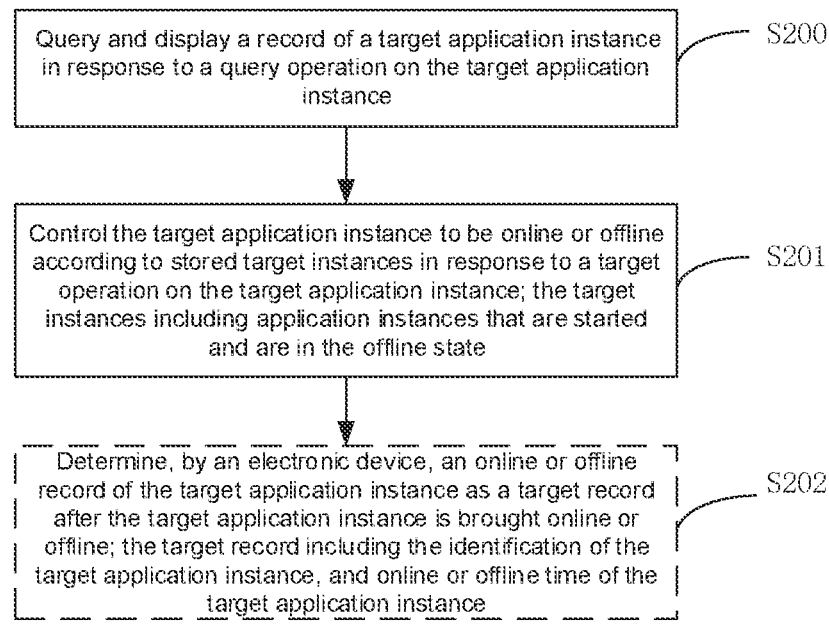
FIG. 3 is a flow diagram of another method for controlling an application instance to be online or offline, in accordance with some embodiments.

In another scene, a user may query a target application instance, and may manage the target application instance to be online or offline. FIG. 3 is a flow diagram of another method for controlling an application instance to be online or offline provided in the embodiments of the present disclosure, and this method may be applied to the electronic device shown in FIG. 1. The method shown in FIG. 3 may include following steps (S200 to S202).

In S200 the electronic device queries and displays a record of the target application instance in response to a query operation on the target application instance. The target application instance is an application instance that is started and is in an offline state, or an application instance that is started and is in an online state. The record includes an identification of the target application instance and a state of the target application instance.

In a possible implementation, the electronic device queries a record corresponding to the identification of the target application instance from all currently started application instances as the record of the target application instance, and displays the record of the target application instance.

Figure 4:
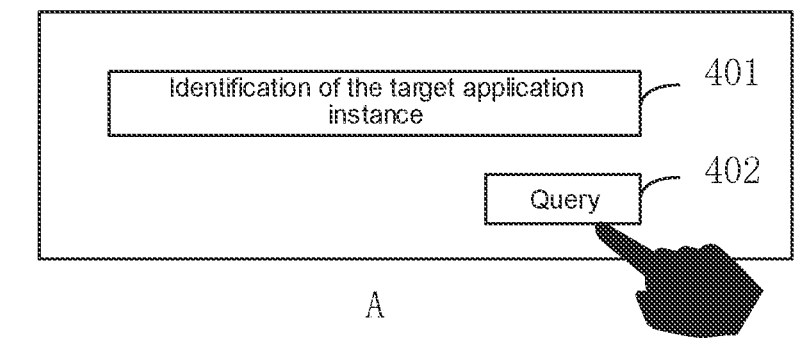
FIG. 4 is a query page diagram of a record of an application instance, in accordance with some embodiments.
Figure 4:
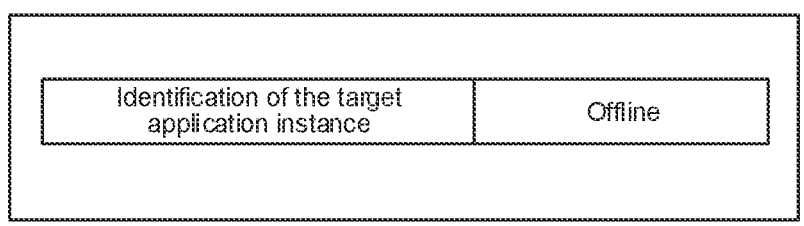

For example, as shown in A of FIG. 4, the electronic device displays a query page of a record of an application instance, and this query page includes a query condition input box 401 and a query button 402. As shown in B of FIG. 4, in response to an input operation of the user and a click operation on the query button, the electronic device queries the record of the application instance corresponding to the identification of the target application instance input by the user from all currently started application instances, and displays the record of the application instance.

In another possible implementation, in response to a query operation on records of all currently started application instances, the electronic device displays the records of all the currently started application instances. The records of the application instances include the record of the target application instance.

Figures 5, 6:
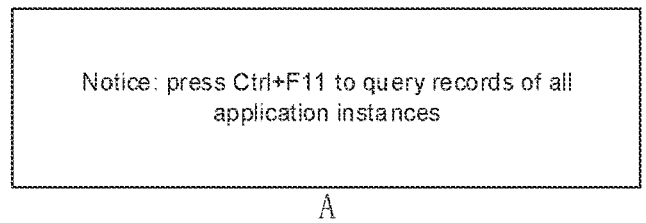
FIG. 5 is another query page diagram of records of application instances, in accordance with some embodiments.
FIG. 6 is a diagram showing an online operation of an application instance, in accordance with some embodiments.

For example, as shown in A of FIG. 5, the electronic device displays a query page of the application instances. In response to the query operation of the user, the electronic device displays the records of the currently started application instances, as shown in B of FIG. 5. The query operation may be a click operation on particular key(s) (e.g., Ctrl and F11 in a keyboard) or a particular gesture.

In S201, the electronic device controls the target application instance to be online or offline according to stored target instances in response to a target operation on the target application instance. The target instances include application instances that are started and are in the offline state.

The electronic device determines whether the target application instance belongs to application instances of the preset type according to the identification of the target application instance, Details refer to the description of S101 in which the electronic device determines whether the target application instance belongs to the application instances of the preset type according to the identification of the target application instance, and will not be repeated.

In a case where the target operation is used for controlling the target application instance to be online, and the target instances include the target application instance, in response to the target operation on the target application instance, the target application instance is brought online, and the target instances are updated. The updated target instances do not include the target application instance in the offline state. In a possible implementation, the electronic device changes a state of the record of the target application instance to the online state. In another possible implementation, the electronic device deletes the target application instance from the target instances. For example, based on A of FIG. 6, after the user clicks an online button 601 of the target application instance, the electronic device brings the target application instance online in response to the online operation on the target application instance. Based on B of FIG. 6, the electronic device displays the state of the target application instance as the online state.

Figure 7:
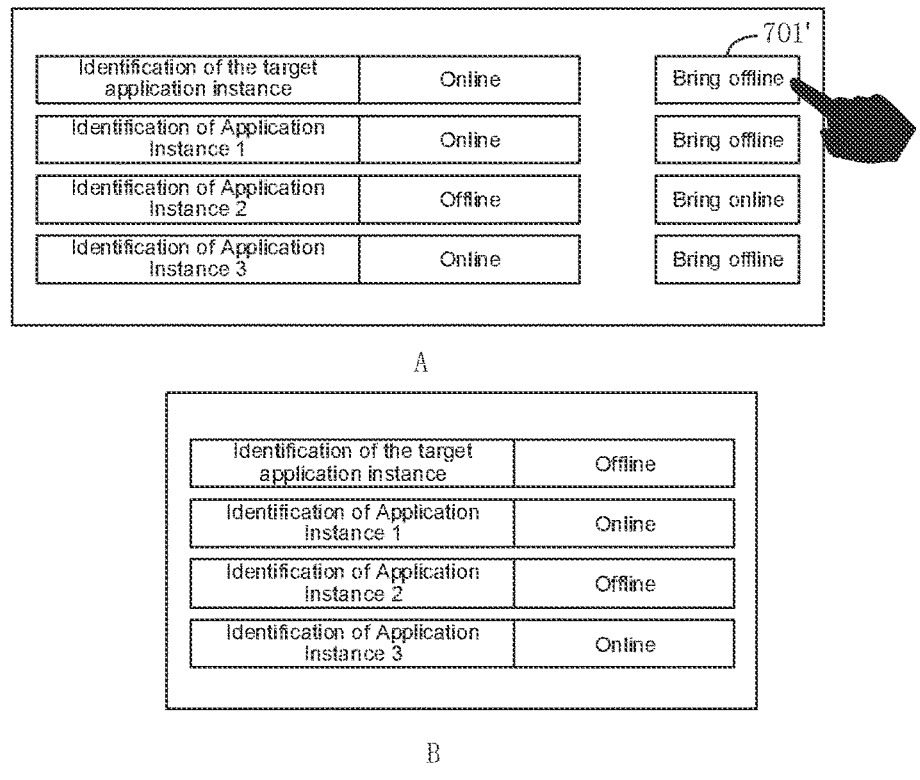
FIG. 7 is a diagram showing an offline operation of an application instance, in accordance with some embodiments.

In a case where the target operation is used for controlling the target application instance to be offline, the target instances do not include the target application instance, and the target application instance belongs to the application instances of the preset type, in response to the target operation on the target application instance, the target application instance is brought offline, and the target application instance in the offline state is determined as a target instance. For example, based on A of FIG. 7, after the user clicks an offline button 701' of the target application instance, the electronic device brings the target application instance offline in response to the offline operation on the target application instance. Based on B of FIG. 7, the electronic device displays the target application instance in the offline state.

Figure 8:
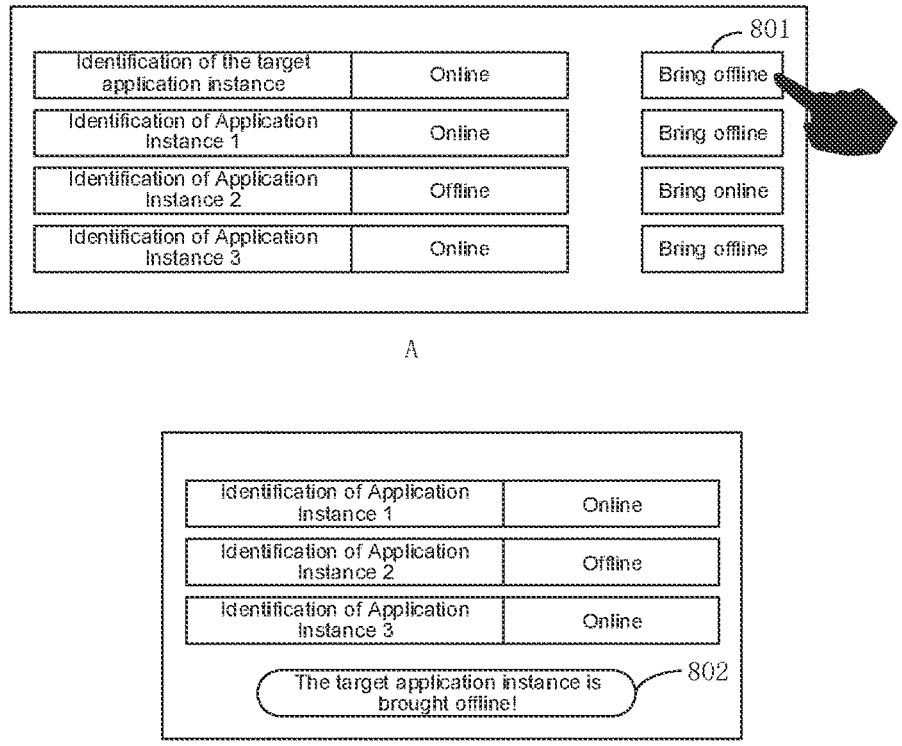
FIG. 8 is a diagram showing another offline operation of an application instance, in accordance with some embodiments.

In a case where the target operation is used for controlling the target application instance to be offline, the target instances do not include the target application instance, and the target application instance does not belong to the application instances of the preset type, in response to the target operation on the target application instance, the target application instance is brought offline. For example, based on A of FIG. 8, after the user clicks an offline button 801 of the target application instance, the electronic device brings the target application instance offline in response to the offline operation on the target application instance. Based on B of FIG. 8, the electronic device displays a notification message shown in 802, but the application instances displayed on the electronic device do not include the target application instance.

In S202, after the target application instance is brought online or offline, the electronic device determines an online or offline record of the target application instance as a target record. The target record includes the identification of the target application instance, and online or offline time of the target application instance.

The electronic device displays all target records in response to the query operation on the target records.

In the embodiments of the present disclosure, the electronic device displays the target application instance in response to the query operation on the target application instance, and controls the target application instance to be online or offline according to the stored target instances in response to the target operation on the target application instance, thereby controlling the application instance to be online or offline. In this way, based on the examples in the above white list, for application instances that are not in the white list and application instances in the white list that are in the offline state, the electronic device may bring an application instance in the target instances online in response to an online operation on this application instance; and may bring an application instance that is started and is in the online state offline, thereby providing a user with an ability to bring an application instance online or offline.

The above description introduces the solutions provided in the embodiments of the present disclosure, primarily from a method perspective. In order to realize the above functions, corresponding hardware structures and/or software modules for executing the functions are included. Those skilled in the art will readily appreciate that the present disclosure is capable of being implemented in a form of hardware or a combination of hardware and computer software with reference to various illustrative units and algorithm steps described in the embodiments disclosed herein. Whether a certain function is executed in a way of hardware or computer software driving hardware depends on a specific application and design constraints of a technical solution. A skilled professional may implement the function by using different methods for each specific application, but such implementation should not be considered outside the scope of the present disclosure.

In the embodiments of the present disclosure, the electronic device in the above embodiments may be divided into functional modules according to the above method examples. For example, the electronic device may be divided into functional modules corresponding to respective functions; alternatively, two or more functions may be integrated into a processing module. The integrated module may be implemented in a form of hardware or software functional module. It will be noted that division of modules in the embodiments of the present disclosure is schematic, and is merely a logic function division, and there may be another division manner in actual implementation.

Figure 9:
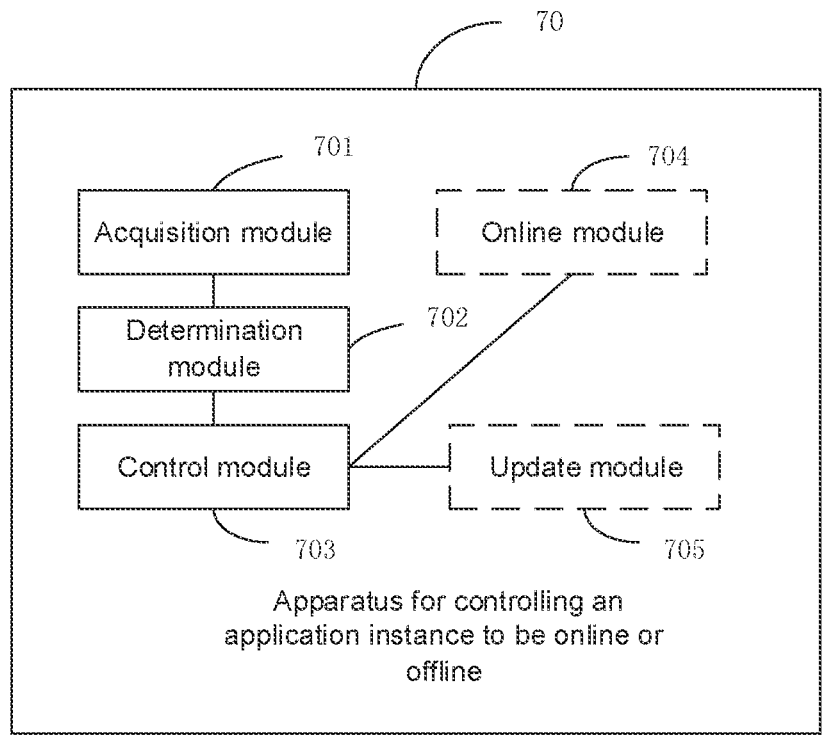
FIG. 9 is a structural diagram of an apparatus for controlling an application instance to be online or offline, in accordance with some embodiments.

FIG. 9 is a structural diagram of an apparatus 70 for controlling an application instance to be online or offline provided in the embodiments of the present disclosure. The apparatus 70 for controlling the application instance to be online or offline includes an acquisition module 701, a determination module 702 and a control module 703. The acquisition module 701 is used for acquiring target indication information, and the target indication information includes an identification of a target application instance. For example, in combination with FIG. 2, the acquisition module 701 may be used to execute S100. The determination module 702 is used for determining an online or offline control instruction of the target application instance according to the acquired target indication information and stored target instances. The target instances include application instances that are started and are in an offline state. For example, in combination with FIG. 2, the determination module 702 may be used to execute S101. The control module 703 is used for controlling the target application instance to be online or offline according to the online or offline control instruction of the target application instance. For example, in combination with FIG. 2, the control module 703 may be used to execute S102.

In a case where the target indication information is used for indicating that the target application instance is to be online, the determination module 702 is used for determining whether the target application instance belongs to application instances of a preset type according to the identification of the target application instance.

In a case where the target application instance belongs to the application instances of the preset type, and the target instances do not include the target application instance, the determination module 702 determines that the online or offline control instruction of the target application instance is used to instruct the target application instance to be online.

In a case where the target application instance belongs to the application instances of the preset type, and the target instances include the target application instance, the determination module 702 determines that the online or offline control instruction of the target application instance is used to instruct the target application instance to be in the offline state.

In a case where the target application instance does not belong to the application instances of the preset type, and the target instances do not include the target application instance, the determination module 702 determines that the online or offline control instruction of the target application instance is used to instruct the target application instance in the offline state to be determined as a target instance.

In a case where the target application instance does not belong to the application instances of the preset type, and the target instances include the target application instance, the determination module 702 determines that the online or offline control instruction of the target application instance is used to instruct the target application instance to be online after receiving an online operation.

In a case where the target indication information is used for indicating that the target application instance is to be offline, the determination module 702 is used for determining whether the target application instance belongs to the application instances of the preset type according to the identification of the target application instance. In a case where the target application instance belongs to the application instances of the preset type, and the target instances do not include the target application instance in the offline state, the determination module 702 determines that the online or offline control instruction of the target application instance is used to instruct the target application instance to be offline and instruct the target application instance in the offline state to be determined as a target instance. In a case where the target application instance does not belong to the application instances of the preset type, the determination module 702 determines that the online or offline control instruction of the target application instance is used to instruct the target application instance to be offline.

In a case where the online or offline control instruction of the target application instance is used to instruct the target application instance to be online after receiving the online operation, the apparatus 70 for controlling the application instance to be online or offline further includes an online module 704 for bringing the target application instance online in response to the online operation on the target application instance in the target instances.

The apparatus 70 for controlling the application instance to be online or offline further includes an update module 705 for updating the target instances. The updated target instances do not include the target application instance in the offline state.

The determination module 702 is further used for determining an online or offline record of the target application instance as a target record. The target record includes the identification of the target application instance, and online or offline time of the target application instance.

The update module 705 is used for updating the target instances in a case where a continuous duration of the target application instance in the offline state included in the target instances is greater than or equal to a preset duration. The updated target instances do not include the target application instance in the offline state.

In an example, referring to FIG. 1, a receiving function of the acquisition module 701 may be implemented by the interface unit 104 in FIG. 1. A processing function of the acquisition module 701, and the determination module 702, the control module 703, the online module 704 and the update module 705 may be implemented by calling a computer program stored in the memory 102 by the processor 101 in FIG. 1.

Specific descriptions of the foregoing manners may refer to the foregoing method embodiments, and will not be repeated here. In addition, an explanation and beneficial effects of any apparatus 70 for controlling the application instance to be online or offline provided above may refer to the above corresponding method embodiments, and will not be repeated.

It will be noted that respective actions executed by the above modules are merely specific examples, and an action actually executed by each unit refers to the action or step mentioned in the description of the embodiments based on FIGS. 2 and 3.

Figure 10:
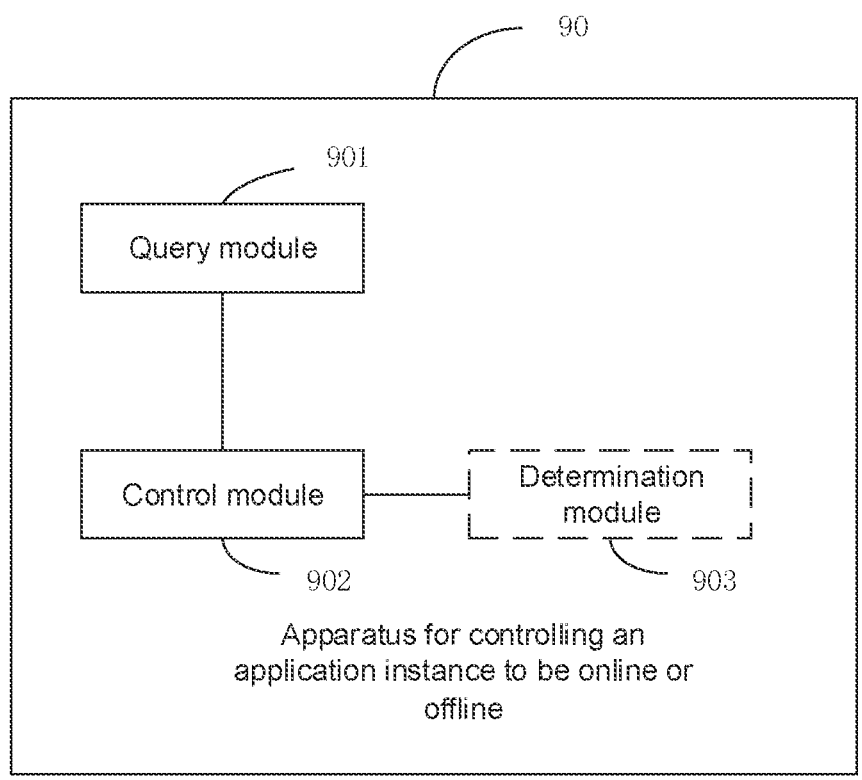
FIG. 10 is a structural diagram of another apparatus for controlling an application instance to be online or offline, in accordance with some embodiments.

As shown in FIG. 10, another apparatus 90 for controlling an application instance to be online or offline provided in the embodiments of the present disclosure includes a query module 901 and a control module 902. The query module 901 is used for querying and displaying a record of a target application instance in response to a query operation on the target application instance. The target application instance is an application instance that is started and is in an offline state, or an application instance that is started and is in an online state. The record includes an identification of the target application instance and a state of the target application instance. For example, in combination with FIG. 3, the query module 901 may be used to execute S200. The control module 902 is used for controlling the target application instance to be online or offline according to stored target instances in response to a target operation on the target application instance. The target instances include application instances that are started and are in the offline state. For example, in combination with FIG. 3, the control module may be used to execute S201.

The query module 901 is used for querying a record corresponding to the identification of the target application instance from all currently started application instances as the record of the target application instance. The apparatus further includes a display module for displaying the record of the target application instance.

The apparatus 90 for controlling the application instance to be online or offline further includes: a determination module 903 for determining whether the target application instance belongs to application instances of the preset type according to the identification of the target application instance. The control module 902 is used for, in a case where the target operation is used to control the target application instance to be online, and the target instances include the target application instance, in response to the target operation on the target application instance, bringing the target application instance online, and updating the target instances. The updated target instances do not include the target application instance in the offline state. The control module 902 is used for, in a case where the target operation is used to control the target application instance to be offline, the target instances do not include the target application instance, and the target application instance belongs to the application instances of the preset type, in response to the target operation on the target application instance, bringing the target application instance offline, and determining the target application instance in the offline state as a target instance. The control module 902 is used for, in a case where the target operation is used to control the target application instance to be offline, the target instances do not include the target application instance, and the target application instance does not belong to the application instances of the preset type, in response to the target operation on the target application instance, bringing the target application instance offline.

The determination module 903 is used for determining an online or offline record of the target application instance as a target record after the target application instance is online or offline. The target record includes the identification of the target application instance, and online or offline time of the target application instance.

In an example, referring to FIG. 1, the query module 901, the control module 902 and the determination module 903 each may be implemented by calling a computer program stored in the memory 102 by the processor 101 in FIG. 1.

Specific descriptions of the foregoing manners may refer to the foregoing method embodiments, and will not be repeated here. In addition, an explanation and beneficial effects of any apparatus 90 for controlling the application instance to be online or offline provided above may refer to the above corresponding method embodiments, and will not be repeated.

It will be noted that respective actions executed by the above modules are merely specific examples, and an action actually executed by each unit refers to the action or step mentioned in the description of the embodiments based on FIGS. 2 and 3.

Some embodiments of the present disclosure provide a computer-readable storage medium (e.g., a non-transitory computer-readable storage medium). The computer-readable storage medium stores computer program instructions that, when run on a processor, cause the processor to execute one or more steps of the method in any one of the above embodiments.

For example, the computer-readable storage medium may include, but is not limited to, a magnetic storage device (e.g., a hard disk, a floppy disk or a magnetic tape), an optical disk (e.g., a compact disk (CD), a digital versatile disk (DVD)), a smart card or a flash memory device (e.g., an erasable programmable read-only memory (EPROM), a card, a stick or a key driver). The various kinds of computer-readable storage media described in the present disclosure may represent one or more devices and/or other machine-readable storage media for storing information. The term "machine-readable storage media" may include, but is not limited to, wireless channels and various kinds of other media capable of storing, containing and/or carrying instructions and/or data.

Some embodiments of the present disclosure further provide a computer program product. The computer program product includes computer program instructions that, when executed on a computer, cause the computer to execute one or more steps of the method for controlling the application instance to be online or offline in the above embodiments.

Some embodiments of the present disclosure further provide a computer program. When executed on a computer, the computer program causes the computer to execute one or more steps of the method for controlling the application instance to be online or offline in the above embodiments.

Beneficial effects of the computer-readable storage medium, the computer program product and the computer program are the same as the beneficial effects of the method for controlling the application instance to be online or offline in some embodiments described above, and will not be repeated here.

The foregoing descriptions are merely specific implementations of the present disclosure. However, the protection scope of the present disclosure is not limited thereto. Changes or replacements that any person skilled in the art could conceive of within the technical scope of the present disclosure shall be included in the protection scope of the present disclosure. Therefore, the protection scope of the present disclosure shall be subject to the protection scope of the claims.

What is claimed is:

1. A method for controlling an application instance to be online or offline, the method comprising:
    acquiring target indication information; the target indication information including an identification of a target application instance;
    determining an online or offline control instruction of the target application instance according to the target indication information and stored target instances; the target instances including application instances that are started and are in an offline state; and
    controlling the target application instance to be online or offline according to the online or offline control instruction of the target application instance; and
    after controlling the target application instance to be online or offline according to the online or offline control instruction of the target application instance, the method further comprising:
    determining an online or offline record of the target application instance as a target record; the target record including the identification of the target application instance, and online or offline time of the target application instance.

2. The method according to claim 1, wherein in a case where the target indication information is used for indicating that the target application instance is to be online, determining the online or offline control instruction of the target application instance according to the target indication information and the stored target instances, includes:
    determining whether the target application instance belongs to application instances of a preset type according to the identification of the target application instance; and
    in a case where the target application instance belongs to the application instances of the preset type, and the target instances do not include the target application instance, determining that the online or offline control instruction of the target application instance is used to instruct the target application instance to be online;
    in a case where the target application instance belongs to the application instances of the preset type, and the target instances include the target application instance, determining that the online or offline control instruction of the target application instance is used to instruct the target application instance to be in the offline state;
    in a case where the target application instance does not belong to the application instances of the preset type, and the target instances do not include the target application instance, determining that the online or offline control instruction of the target application instance is used to instruct the target application instance in the offline state to be determined as a target instance;

in a case where the target application instance does not belong to the application instances of the preset type, and the target instances include the target application instance, determining that the online or offline control instruction of the target application instance is used to instruct the target application instance to be online after receiving an online operation.

3. The method according to claim 2, wherein in a case where the online or offline control instruction of the target application instance is used to instruct the target application instance to be online after receiving the online operation, the method further comprises:
bringing the target application instance online in response to the online operation on the target application instance in the target instances; or
in the case where the online or offline control instruction of the target application instance is used to instruct the target application instance to be online after receiving the online operation, the method further comprises:
bringing the target application instance online in response to the online operation on the target application instance in the target instances; and
updating the target instances after the target application instance is brought online; the updated target instances doing not include the target application instance in the offline state.

4. The method according to claim 1, wherein in a case where the target indication information is used for indicating that the target application instance is to be offline, determining the online or offline control instruction of the target application instance according to the target indication information and the stored target instances, includes:
determining whether the target application instance belongs to application instances of a preset type according to the identification of the target application instance; and
in a case where the target application instance belongs to the application instances of the preset type, and the target instances do not include the target application instance in the offline state, determining that the online or offline control instruction of the target application instance is used to instruct the target application instance to be offline and instruct the target application instance in the offline state to be determined as a target instance;
in a case where the target application instance does not belong to the application instances of the preset type, determining that the online or offline control instruction of the target application instance is used to instruct the target application instance to be offline.

5. The method according to claim 4, wherein in a case where the target application instance belongs to the application instances of the preset type, the method further comprises:
in a case where a continuous duration of the target application instance in the offline state included in the target instances is greater than or equal to a preset duration, updating the target instances; the updated target instances doing not include the target application instance in the offline state.

6. A non-transitory computer-readable storage medium storing computer program instructions, wherein when run on a processor, the computer program instructions cause the processor to execute the method according to claim 1.

7. A computer program product embodied on a non-transitory computer-readable storage medium, the computer program product comprising computer program instructions; wherein when run on a computer, the computer program instructions cause the computer to execute the method according to claim 1.

8. A method for controlling an application instance to be online or offline, comprising:
querying and displaying a record of a target application instance in response to a query operation on the target application instance; wherein the target application instance is an application instance that is started and is in an offline state, or an application instance that is started and is in an online state; the record includes an identification of the target application instance and a state of the target application instance;
controlling the target application instance to be online or offline according to stored target instances in response to a target operation on the target application instance; the target instances including application instances that are started and are in the offline state; and
after the target application instance is brought online or offline, determining an online or offline record of the target application instance as a target record; the target record including the identification of the target application instance, and online or offline time of the target application instance.

9. The method according to claim 8, wherein querying and displaying the record of the target application instance, includes:
querying a record corresponding to the identification of the target application instance from all currently started application instances as the record of the target application instance; and
displaying the record of the target application instance.

10. The method according to claim 8, wherein controlling the target application instance to be online or offline according to the stored target instances in response to the target operation on the target application instance, includes:
determining whether the target application instance belongs to application instances of a preset type according to the identification of the target application instance; and
in a case where the target operation is used for controlling the target application instance to be online, and the target instances include the target application instance, in response to the target operation on the target application instance, bringing the target application instance online, and updating the target instances; the updated target instances doing not include the target application instance in the offline state;
in a case where the target operation is used for controlling the target application instance to be offline, the target instances do not include the target application instance, and the target application instance belongs to the application instances of the preset type, in response to the target operation on the target application instance, bringing the target application instance offline, and determining the target application instance in the offline state as a target instance;
in a case where the target operation is used for controlling the target application instance to be offline, the target instances do not include the target application instance, and the target application instance does not belong to the application instances of the preset type, in response to the target operation on the target application instance, bringing the target application instance offline.

11. An electronic device, comprising:
a processor and a memory for storing instructions executable by the processor; wherein the processor is configured to execute the executable instructions, so as to implement the method according to claim 8.

12. A non-transitory computer-readable storage medium storing computer program instructions, wherein when run on a processor, the computer program instructions cause the processor to execute the method according to claim 8.

13. A computer program product embodied on a non-transitory computer-readable storage medium, the computer program product comprising computer program instructions; wherein when run on a computer, the computer program instructions cause the computer to execute the method according to claim 8.

14. An electronic device, comprising:
a processor and a memory for storing instructions executable by the processor; wherein the processor is configured to execute the executable instructions, so as to implement a method for controlling an application instance to be online or offline; the method includes:
acquiring target indication information; the target indication information including an identification of a target application instance;
determining an online or offline control instruction of the target application instance according to the target indication information and stored target instances; the target instances including application instances that are started and are in an offline state; and
controlling the target application instance to be online or offline according to the online or offline control instruction of the target application instance; and
after controlling the target application instance to be online or offline according to the online or offline control instruction of the target application instance, the method further includes:
determining an online or offline record of the target application instance as a target record; the target record including the identification of the target application instance, and online or offline time of the target application instance.

15. The electronic device according to claim 14, wherein in a case where the target indication information is used for indicating that the target application instance is to be online, determining the online or offline control instruction of the target application instance according to the target indication information and the stored target instances, includes:
determining whether the target application instance belongs to application instances of a preset type according to the identification of the target application instance; and
in a case where the target application instance belongs to the application instances of the preset type, and the target instances do not include the target application instance, determining that the online or offline control instruction of the target application instance is used to instruct the target application instance to be online;
in a case where the target application instance belongs to the application instances of the preset type, and the target instances include the target application instance, determining that the online or offline control instruction of the target application instance is used to instruct the target application instance to be in the offline state;
in a case where the target application instance does not belong to the application instances of the preset type, and the target instances do not include the target application instance, determining that the online or offline control instruction of the target application instance is used to instruct the target application instance in the offline state to be determined as a target instance;
in a case where the target application instance does not belong to the application instances of the preset type, and the target instances include the target application instance, determining that the online or offline control instruction of the target application instance is used to instruct the target application instance to be online after receiving an online operation.

16. The electronic device according to claim 14, wherein in a case where the target indication information is used for indicating that the target application instance is to be offline, determining the online or offline control instruction of the target application instance according to the target indication information and the stored target instances, includes:
determining whether the target application instance belongs to application instances of a preset type according to the identification of the target application instance; and
in a case where the target application instance belongs to the application instances of the preset type, and the target instances do not include the target application instance in the offline state, determining that the online or offline control instruction of the target application instance is used to instruct the target application instance to be offline and instruct the target application instance in the offline state to be determined as a target instance;
in a case where the target application instance does not belong to the application instances of the preset type, determining that the online or offline control instruction of the target application instance is used to instruct the target application instance to be offline.

17. The electronic device according to claim 16, wherein in a case where the target application instance belongs to the application instances of the preset type, the method further includes:
in a case where a continuous duration of the target application instance in the offline state included in the target instances is greater than or equal to a preset duration, updating the target instances; the updated target instances doing not include the target application instance in the offline state.

* * * * *